INFORMATION STORAGE AND DISPLAY SYSTEM

Filed Dec. 9, 1969 2 Sheets-Sheet 1

INVENTOR
ROBERT A. RIVERS

BY Strauch, Nolan, Neale, Nies & Kurz
ATTORNEYS

INVENTOR

ROBERT A. RIVERS

BY Strauch, Nolan, Neale, Nies & Kurz

ATTORNEYS

United States Patent Office 3,606,692

Patented Sept. 21, 1971

3,606,692

INFORMATION STORAGE AND DISPLAY SYSTEM

Robert A. Rivers, 52 Orlando Ave., Winthrop, Mass. 02152

Filed Dec. 9, 1969, Ser. No. 883,409
Int. Cl. G09f 3/10
U.S. Cl. 40—10 4 Claims

ABSTRACT OF THE DISCLOSURE

An information storage and display system including a carrier having a pair of columns of vertically spaced slits and a plurality of cards the lower corners of which removably project through a set of slits. Each of the cards includes a number of information lines and the cards are assembled on the carrier such that a desired number of lines of each card and the information contained thereon are visibly displayed. The cards are locked in place on the carrier in the desired pattern to prevent any card from being inadvertently lost from the carrier.

BACKGROUND OF THE INVENTION

This invention relates generally to information storage and display systems and more particularly to a novel information card display system which is relatively simple in structure, highly economical and useful, and readily assembled and disassembled to visually display specific business information at any particular time.

In the past, various type information storage devices employing information cards have been used. For example, some devices utilize a number of hinged cards, specially die-cut cards having tabs which retain the cards on a specially constructed multi-walled container, and/or specially constructed doubly hinged, card-holding plastic pockets. Because of the necessity of die-cut, tab including cards and other special features, such prior devices have been expensive and limited in application. In addition, none has provided a system in which the individual cards are quickly and easily removably assembled in the carrier, but yet are locked in place on the carrier against inadvertent removal therefrom.

SUMMARY OF THE INVENTION

Accordingly, the primary object of the invention resides in the provision of a novel information storage and display device which is simple in construction, inexpensive, highly versatile in application, and readily adjustable or changeable to visually display and reflect an up-to-date business picture.

Another object resides in the provision of a novel information storage and display device including a plurality of removable cards having an information bearing area comprising a number of display lines of standard height on which business information is placed and a carrier on which the cards are removably mounted, the cards being suitably arranged relative to each other on the carrier so that a desired number of lines on each card and the information contained thereon are visually exposed.

Still another object of the invention resides in the provision of a novel information storage and display device as described in the above objects in which the cards are of a simple, standard, generally rectangular form and the carrier includes a plurality of vertically spaced slits through which the lower corners of the cards project. The spacing between the slits is substantially equal to the height of the display lines on the cards so that adjacent cards may be placed in appropriate spaced slits to suitably display a desired number of lines on each card. In addition, locking means is provided to secure the cards on the carrier so that the device as a whole may be handled normally without fear of any cards becoming inadvertently detached and lost for the carrier.

A further object of the invention resides in the provision of a novel visual information storage and display device as described in the above object which may be readily handled in various ways and which may be directly copied on any standard office copying machine to provide a permanent office record of the information displayed thereon.

Further objects and advantages will become apparent from reading the following description of the invention with reference to the accompanying drawings throughout which like elements are indicated by like numerals.

DETAILED DESCRIPTION OF SEVERAL EMBODIMENTS OF THE INVENTION

Figure 1:
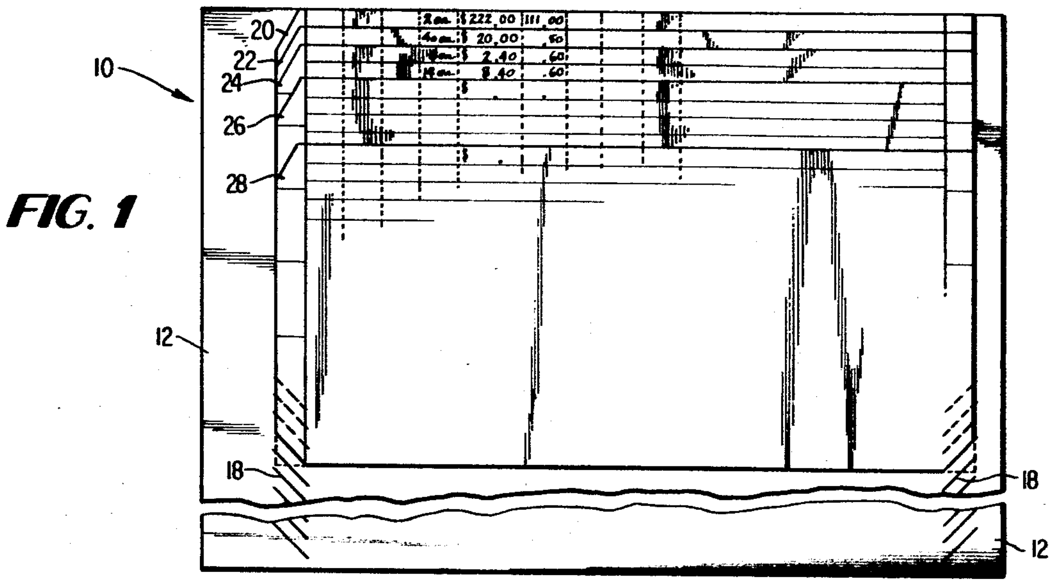
FIG. 1 is a fragmentary front view of the novel information storage and display system of the invention.
Figure 2:
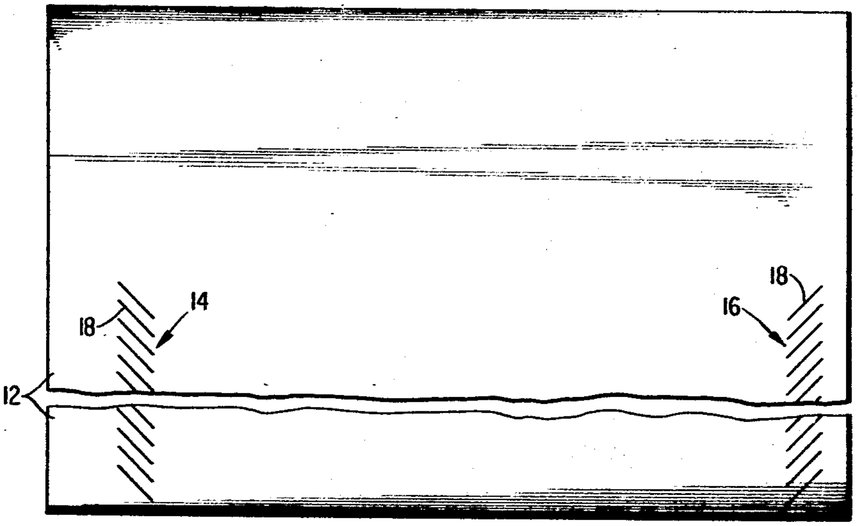
FIG. 2 is a fragmentary front view of the card carrier which forms part of the display system illustrated in FIG. 1.
Figure 3:
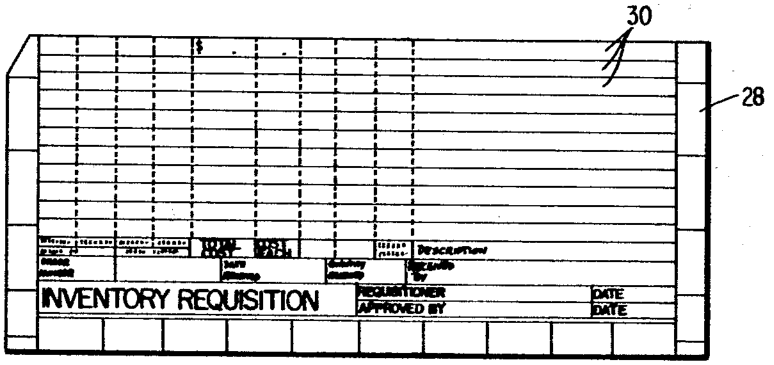
FIG. 3 is a front view of a typical standard information card employed in the display system of FIG. 1.

Referring now to FIGS. 1–3, the novel visible information storage and display device 10 of the invention includes a semi-rigid card carrier 12, such as a manila file folder or a three ring manila binder page, the carrier having a pair of columns 14 and 16 of vertically spaced slits 18, with the slits in each column being angled downwardly and inwardly at a 45° angle toward the center of the carrier.

Each of a plurality of information cards 20, 22, 24, 26 and 28 is mounted on carrier 12 by inserting its lower right angle corners through respectively horizontally aligned slits 18 in columns 14 and 16. As exemplified by card 28 in FIG. 3, each of the cards is of standard generally rectangular shape having lower right angle corners and includes an information bearing area formed by a plurality of horizontal lines or spaces 30 in which information may be written, typed or printed. The vertical spacing between adjacent slits 18 in each column 14 and 16 is equal to the vertical height of the card line 30 and thus enables any number of lines on each card to be clearly visibly exposed. For example, in FIG. 1, the bottom card 20 is inserted into the uppermost set of slits and card 22 into the next lower set of slits, thereby exposing only the top line of card 20. Similarly, card 24 is inserted into the next lower set of slits to expose only the top line of card 22. However, card 25 is inserted two slits lower in carrier 12 to expose the top two lines of card 24. Similarly, the top card 28 is inserted four slits lower to expose the top four lines of card 26.

Figure 4:
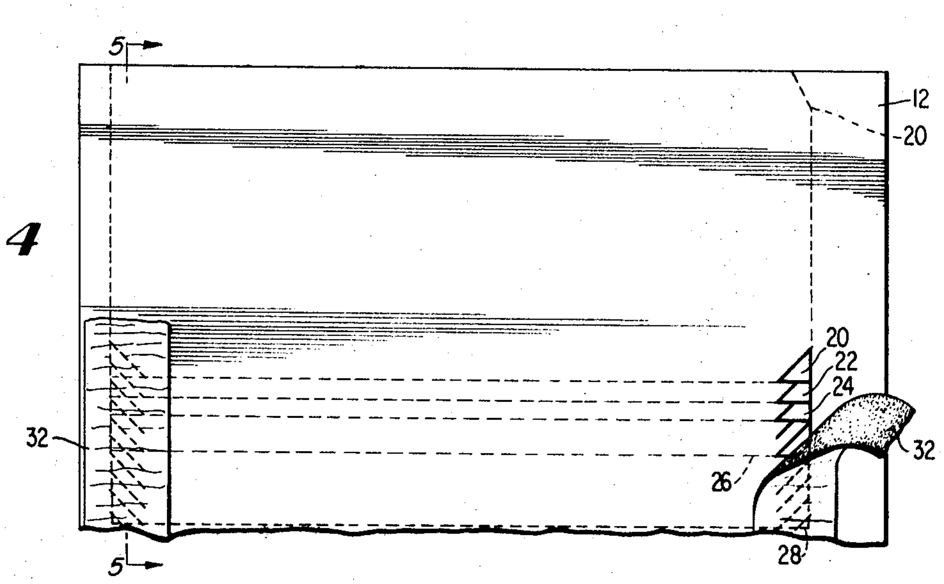
FIG. 4 is a fragmentary back view of the display system shown in FIG. 1 and illustrating the preferred manner by which the cards are locked in a suitable arrangement on the carrier.
Figure 5:
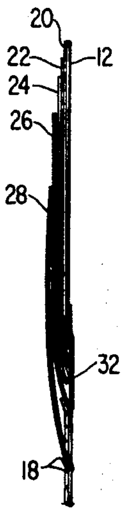
FIG. 5 is a fragmentary sectional view taken generally along line 5—5 of FIG. 4.

Any number of cards may be used and arranged to suitably and visibly display the type of business information desired. When all the cards are initially placed into carrier 12, as shown in FIGS. 4 and 5 a strip of suitable adhesive tape 32, such as masking tape or cellophane tape, is secured vertically on the back of carrier 12 across the corners of the cards which protrude through slits 18. In this manner, the cards are locked and seated in place on carrier 12 so that the carrier may be handled in any reasonable normal manner without the cards inadvertently falling and being lost therefrom. For example, carrier 12 may be inverted and the cards will still be retained in place.

After the display device 10 has been assembled, the replacement of a card or cards is easily accomplished even though the cards are normally taped in place. To replace one of the cards, a blank card is inserted directly in back of the one to be replaced downwardly through the same slits to break the tape seal and permit the one card to be removed. After a change is made on the removed card or a new card is prepared, the changed or new card is inserted directly behind the previously inserted blank card, which is then removed. The tape is then pressed against the back of the carrier to lock the replaced card in place on the carrier.

Figure 6:
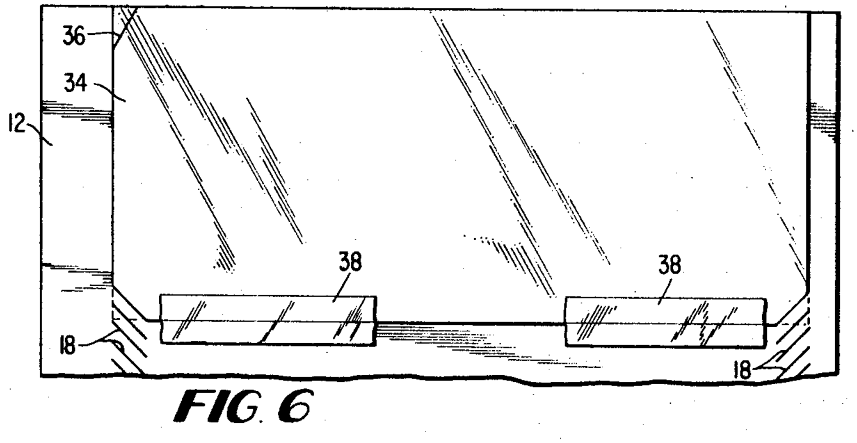
FIG. 6 is a front view of another embodiment of the invention illustrating the use of a full card-size clear plastic guide and locking piece for the removal of cards.

The embodiment of the invention illustrated in FIG. 6 is identical to that already described, except that each of the cards is locked in place on carrier 12 by a transparent clear plastic sheet 34 of rectangular configuration substantially equal in size to that of the cards. The lower corners of sheet 34 project through the same set of slits 18 through which its respective card 36 is to project and is retained in the front of carrier 12 by a pair of adhesive strips 38 extending horizontally across its bottom edge and permitting rapid removal and replacement of sheet 34. A card can be easily inserted in back of the plastic sheet and into the same slits through which the sheet corners project. The sheet acts as a guide for the card when it is originally inserted or when it is removed and replaced which may be accomplished without difficulty. In addition, the sheet protects the cards from soiling without restricting its readability and frictionally locks the card in place on a carrier to prevent inadvertent separation and loss therefrom.

Although only one sheet 34 and card 36 are illustrated in FIG. 6, any number of cards and sheets may be placed on the carrier and suitably arranged to display a desired number of lines on each card. This may be accomplished in the same manner as described previously with respect to the preferred embodiment of FIGS. 1 through 5.

Figure 7:
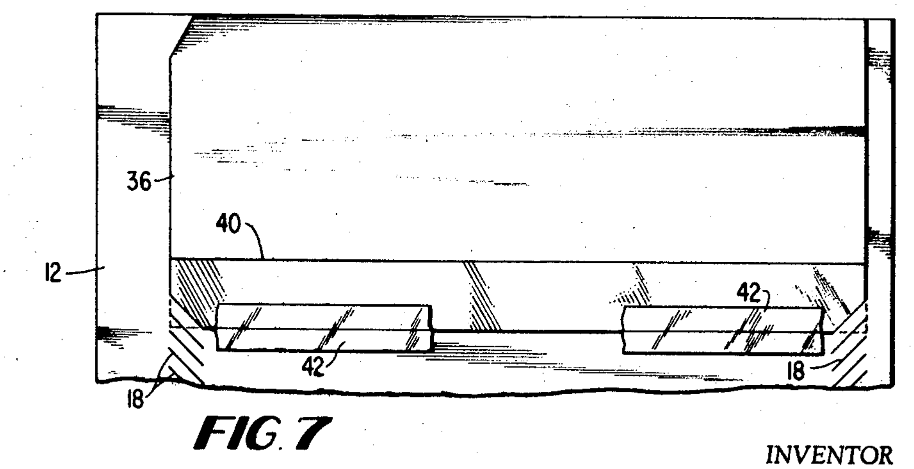
FIG. 7 is a front view of yet another embodiment of the invention similar to that of FIG. 6, but employing only a narrow, clear plastic, guide and locking strip for the removal of cards.

The embodiment of the invention illustrated in FIG. 7 is identical to that of FIG. 6, except that a narrow rectangular clear plastic strip 40 having a width equal to that of card 36 is employed to guide the card into its respective slits 18. Again however, strips of tape 42 extend across the bottom edge of guide strip 40 at the front of carrier 12. The embodiment of FIG. 7 enables one to write on all exposed areas of the card 36 above strip 40 without having to remove the card from the carrier.

It is apparent that the invention described above provides an information storage and display which is simple and inexpensive, but yet effective in visibly displaying desired information which may be quickly retrieved and copied from a permanent record. The cards forming part of the invention are simple and of standardized form and thus very inexpensive in cost. Since they do not require any special structural features such as locating tabs, they can be produced, printed, and cut accurately to length on modern high-speed rotary presses and the appropriate information placed thereon by hand or typewriter. The cards are readily assembled in the carrier in any desired fashion and, although normally locked in place, may be quickly replaced to change and update the information displayed by the system. The complete displayed information may be copied by conventional office copying machines to produce a permanent record thereof for future use.

Various types of business records may be kept with the system or device of the invention. For example, complete business and accounting records such as payroll journals, sales records, inventory records, and so on may be maintained by relatively inexperienced office help. Other uses may include salesmen's reports, doctor's office records, or any application requiring simplicity, low cost, visible display, quick retrieval, and copyability.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range or equivalency of the claims are therefore intended to be embraced therein.

What is claimed and desired to be secured by Letters Patent is:

1. An information storage and display device comprising a carrier having a plurality of vertically spaced openings, a plurality of information bearing cards, the lower corners of which project through said openings, each of said cards having a plurality of horizontal information bearing lines, and said openings being vertically spaced a distance substantially equal to the height of one of said lines whereby said cards may be placed on the front of said carrier into respective ones of said openings so that any desired number of lines on each card may be visibly displayed, and locking means for retaining said cards on said carrier, comprising a removable adhesive strip attached to the back of said carrier and overlying the corners of said cards which project through said openings, thereby securing said cards in place on said carrier and preventing inadvertent removal therefrom.

2. An information storage and display device comprising a carrier having a plurality of vertically spaced openings, a plurality of information bearing cards, the lower corners of which project through said openings, each of said cards having a plurality of horizontal information bearing lines, and said openings being vertically spaced a distance substantially equal to the height of one of said lines whereby said cards may be placed on the front of said carrier into respective ones of said openings so that any desired number of lines on each card may be visibly displayed, and locking means for retaining said cards on said carrier, comprising a plurality of transparent guide means attached to the front of said carrier and having lower corners which extend through respective ones of said openings, said cards being insertable between said guide means and carrier and directed by said guide means into said respective ones of said openings.

3. An information storage and display device as defined in claim 2, each of said guide means comprising a clear plastic sheet substantially equal in size to said cards.

4. An information storage and display device as defined in claim 2, each of said guide means comprising a narrow clear plastic strip overlying the lower portion of said cards.

References Cited

UNITED STATES PATENTS 1,557,217 10/1925 Ringler .............. 40—63
1,853,057 4/1932 Hutchens .............. 40—63

FOREIGN PATENTS 483,975 1/1938 Great Britain ...... 40—104.19

ROBERT W. MICHELL, Primary Examiner

W. J. CONTRERAS, Assistant Examiner